United States Patent [19]

Cosson

[11] Patent Number: 4,828,041
[45] Date of Patent: May 9, 1989

[54] AGRICULTURAL IMPLEMENTS

[76] Inventor: Keith J. Cosson, 416 N. Washington, Grand Island, Nebr. 68801

[21] Appl. No.: 152,143

[22] Filed: Feb. 4, 1988

Related U.S. Application Data

[63] Continuation-in-part of Ser. No. 66,489, Jun. 26, 1987, Pat. No. 4,784,227, which is a continuation-in-part of Ser. No. 929,189, Nov. 10, 1986, Pat. No. 4,781,253.

[51] Int. Cl.⁴ .................... A01B 13/00; A01B 39/26
[52] U.S. Cl. .................... 172/509; 172/733; 172/742; 172/701
[58] Field of Search ............ 172/508, 509, 741, 733, 172/742, 699, 700, 364, 764, 727, 749, 701

[56] References Cited

U.S. PATENT DOCUMENTS

| | | | |
|---|---|---|---|
| 609,370 | 8/1898 | Sargeant | 172/733 X |
| 848,565 | 3/1907 | McMullin | 172/742 X |
| 1,715,616 | 6/1929 | Overholt | 172/701 |
| 2,642,791 | 6/1953 | Peacock | 172/764 X |
| 2,662,311 | 12/1953 | Chattin | 172/706 X |
| 3,380,538 | 4/1968 | Ganteaume | 172/701 |
| 3,465,828 | 9/1969 | Harris | 172/508 X |
| 3,557,883 | 1/1971 | Shader | 172/741 |
| 3,581,685 | 6/1971 | Taylor | 172/700 |
| 3,713,497 | 1/1973 | Hawkins | 172/753 |
| 4,304,304 | 12/1981 | Herschberger | 172/252 |
| 4,333,533 | 6/1982 | Zahra | 172/508 |

Primary Examiner—Richard J. Johnson
Attorney, Agent, or Firm—Dean P. Edmundson

[57] ABSTRACT

Agricultural tilling implements are described. In some embodiments the implements are adapted for deep tilling of soil between growing row crops, in which embodiments a horizontal shield member is detachably secured to a depending shank. The front edge of the shield is sloped upwardly. The shield prevents soil from being thrown upwardly and onto the top of growing row crops during tilling between the rows. The shield also guides loosened soil around the base of growing crops in the rows. In one embodiment the implement includes downwardly depending plate members beneath the shield to urge soil outwardly from the shank to the row crops to form a hill in each row without covering the crops. In another embodiment a V-shaped ditcher is disposed beneath the shield for forming a trench or ditch between adjacent rows of crops. Both embodiments include adjustable wing members or deflectors at the trailing edge of each plate member to control the amount of loosened soil which is urged outwardly to the row crops.

20 Claims, 10 Drawing Sheets

AGRICULTURAL IMPLEMENTS

CROSS-REFERENCE TO RELATED APPLICATION

This application is a continuation-in-part of my copending application Ser. No. 07/066,489, filed June 26, 1987, U.S. Pat. No. 4,754,227 which is a continuation-in-part of my copending application Ser. No. 929,189 filed Nov. 10, 1986 U.S. Pat. No. 4,781,253.

FIELD OF THE INVENTION

This invention relates to tilling implements of the type used in the agricultural tilling. More particularly, this invention relates to tilling implements which are useful for tillage of soil between growing row crops. In another embodiment this invention relates to ditching implements.

BACKGROUND OF THE INVENTION

Agricultural tillers of various types have been previously described and used since man began growing crops for food. Some of these prior tillers are described, for example, in U.S. Pat. Nos. 311,909; 464,102; 589,337; 668,178; 687,115; 990,738; 1,359,404; 2,065,174; 2,241,276; 4,415,042; and 4,618,006.

There have not previously been described, however, tillers of the type provided by this invention.

In my prior filed applications, identified above there is described, in one embodiment, an improvement to an agricultural ripper tiller implement for deep tilling of soil between growing row crops. The tiller is of the type having a downwardly depending shank and a shoe member carried by the lower end of the shank. The improvement comprises a shield member which is adapted to be detachably secured to the shank in a generally horizontal plane. The front edge of the shield is sloped upwardly, and the shield extends outwardly from opposite sides of the shank.

The shield is positioned on the shank in a manner such that when the shank and the shoe are pulled through the soil the shield member enables soil to move outwardly from the shank to the row crops without covering the crops. The shield member also prevents large clumps and clods of dirt from being thrown upwardly by the shank and shoe. The shield also assures that the ground is closed behind the shank so as to keep the soil from drying out.

The shield member preferably is vertically adjustable on the shank. This enables the ripper to be used at any desired depth in the soil. The shield member preferably is at or just slightly above ground level when the shank and shoe are in the soil at the desired depth.

In another embodiment described in my said prior applications the shield member is used and a pair of downwardly depending plate members is disposed under the shield. The plate members are angled outwardly from front to rear so that they form a V-shape, with the apex being the leading edge. One such plate member is positioned on each side of the shank.

Thus, when the shank and shoe are pulled through the soil, the shield member and the plate members urge the soil outwardly from the shank to the row crops to form a hill in each row without covering the crops. Preferably the top edges of the plate members are firmly secured to the bottom of the shield (e.g., by welding or by bolting them to the shield).

In yet another embodiment in my said prior applications there is provided a ditching implement which is useful for ditching soil between row crops. This implement includes a shank member, a shield member attached to the shank in a generally horizontal plane, a V-shaped plate member disposed beneath the shield member, and support means for supporting the shank (e.g., a conventional tool bar).

When the V-shaped plate member is pulled through the soil the shield member and the V-shaped plate member urge the soil outwardly from the shank to form a ditch between the row crops. The ditch is very beneficial for movement of water when irrigating the row crops.

Another improvement described in my said prior applications relates to adjustable wing members or deflectors to be used in conjunction with the ditching implement and the tilling implement used to form a hill in each row of growing row crops.

The use of adjustable wing members or deflectors enables the implements to be used between adjacent rows of growing row crops regardless of the spacing or distance between adjacent rows. The wing members are carried at the trailing edge of the V-shaped plates under the shield member. Each wing member can be adjusted, as desired, to control the amount of loosened soil which is pushed toward the rows of growing crops. By angling the wing members farther outwardly the amount of loosened soil is pushed farther outwardly.

Other advantages of the implements of the present invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
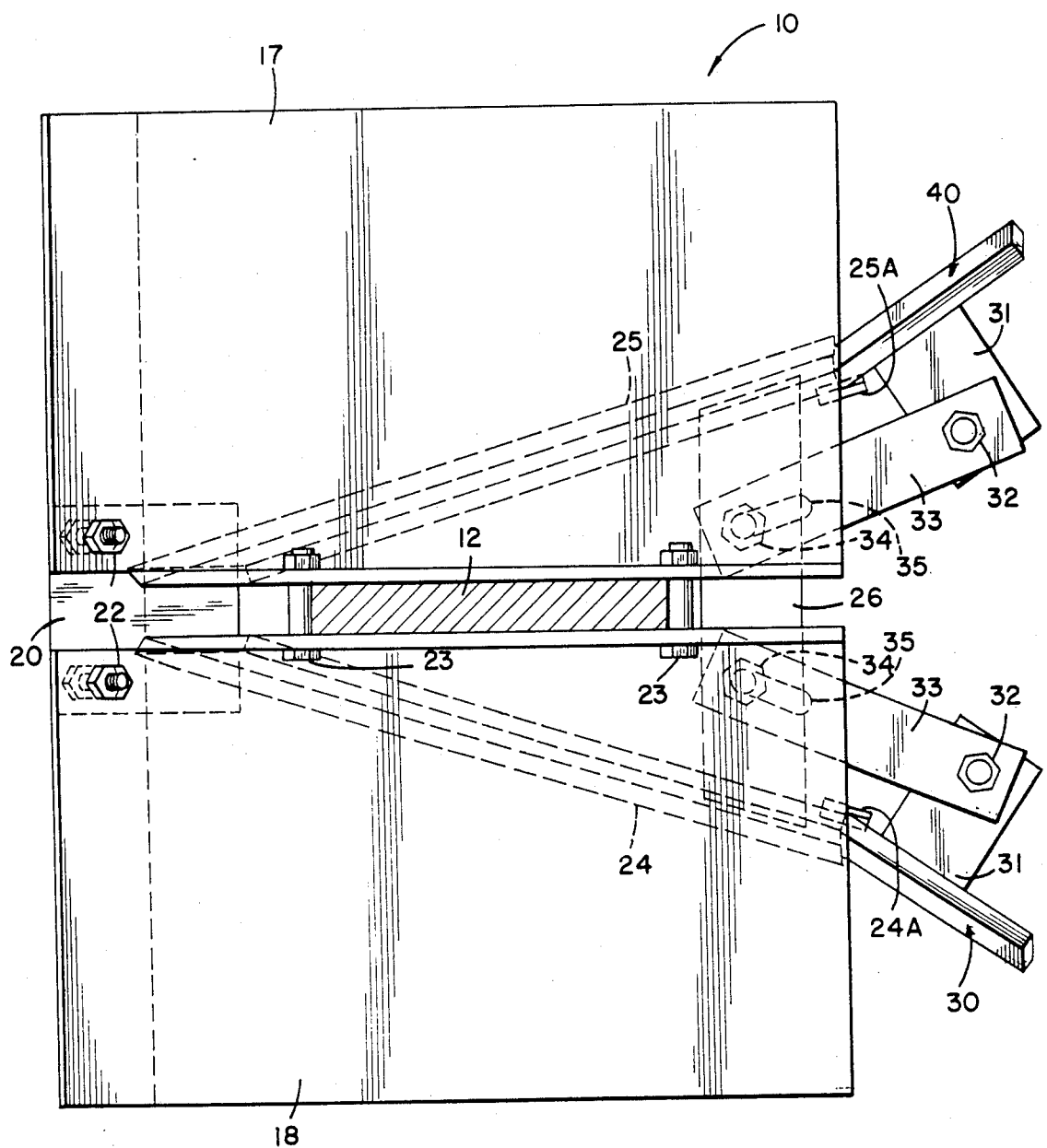
FIG. 1 is a top view of one embodiment of agricultural tilling implement of this invention.
Figure 2:
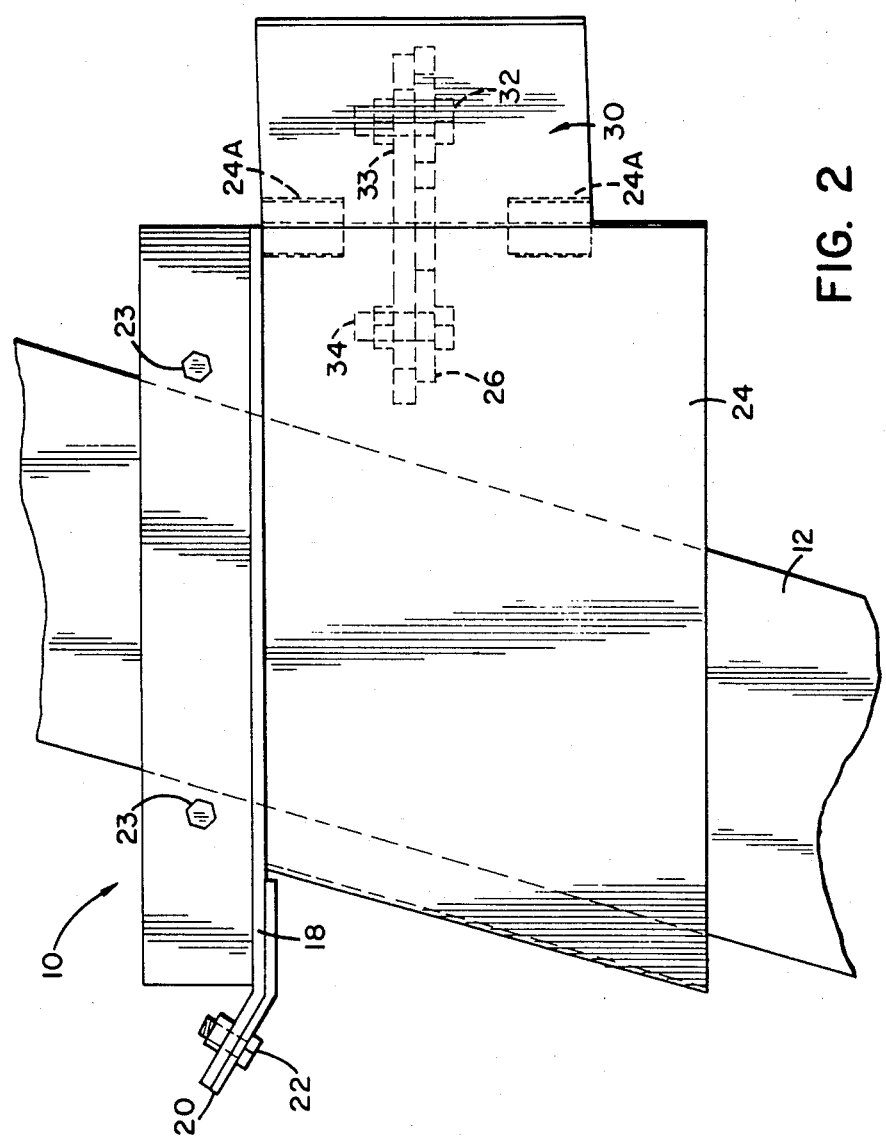
FIG. 2 is a side elevational view of the tilling implement shown in FIG. 1.
Figure 3:
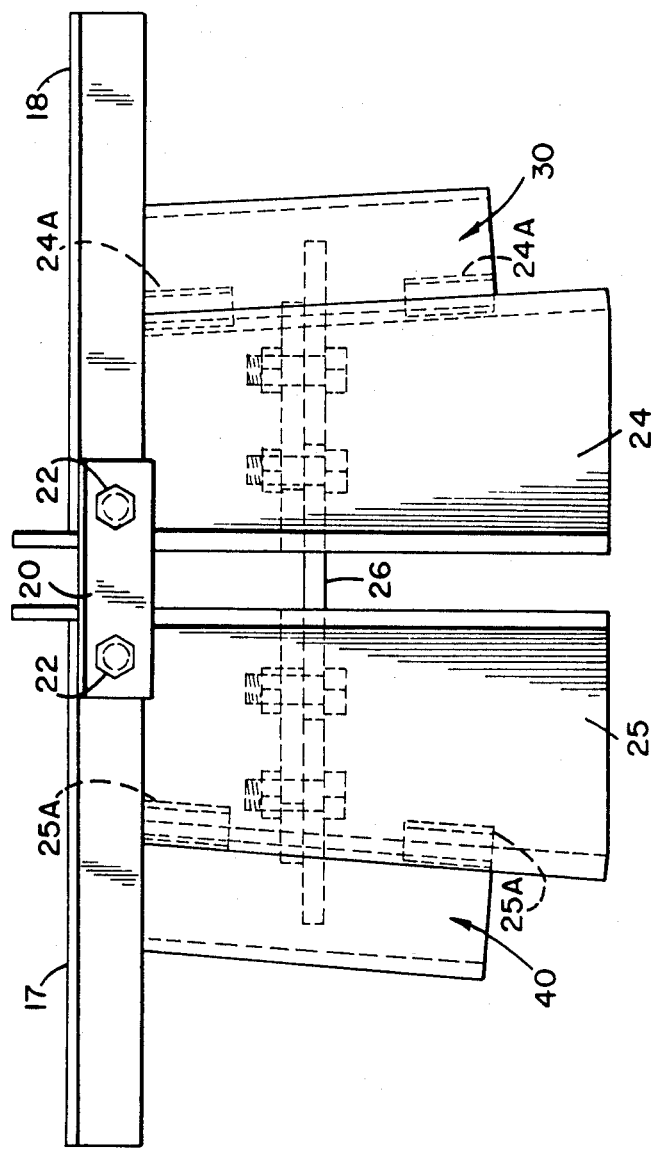
FIG. 3 is a front elevational view of the embodiment of agricultural tilling implement of FIG. 1 (without the shank present)
Figure 4:
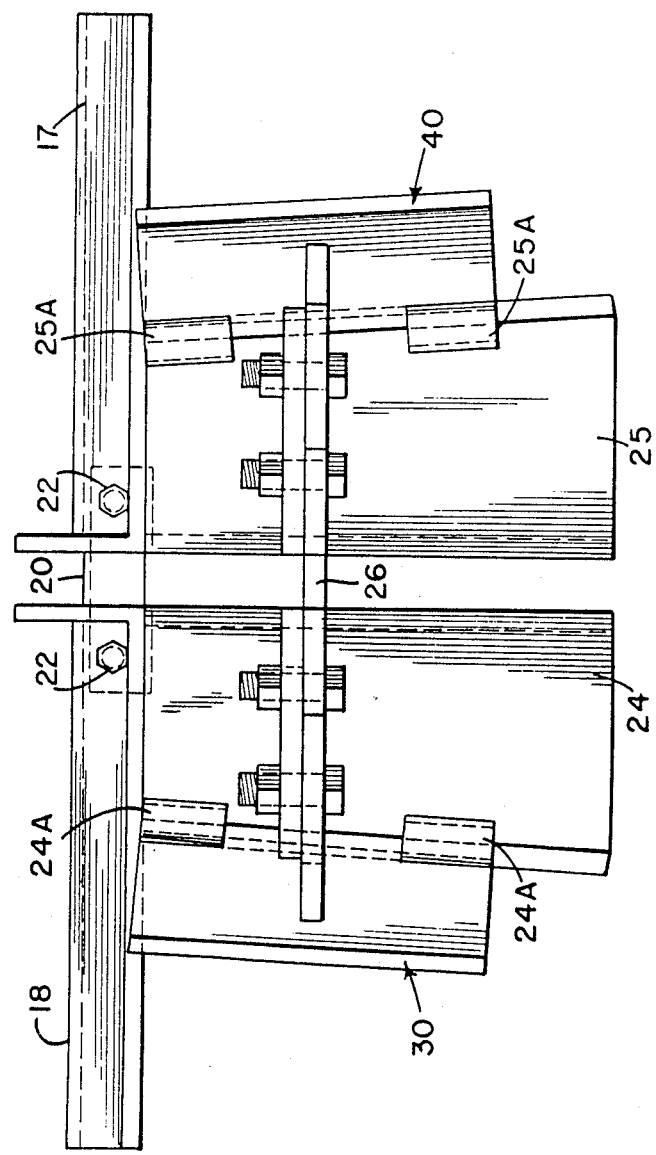
FIG. 4 is a rear elevational view of the embodiment of agricultural tilling implement of this shown in FIG. 1 (without the shank present)
Figure 5:
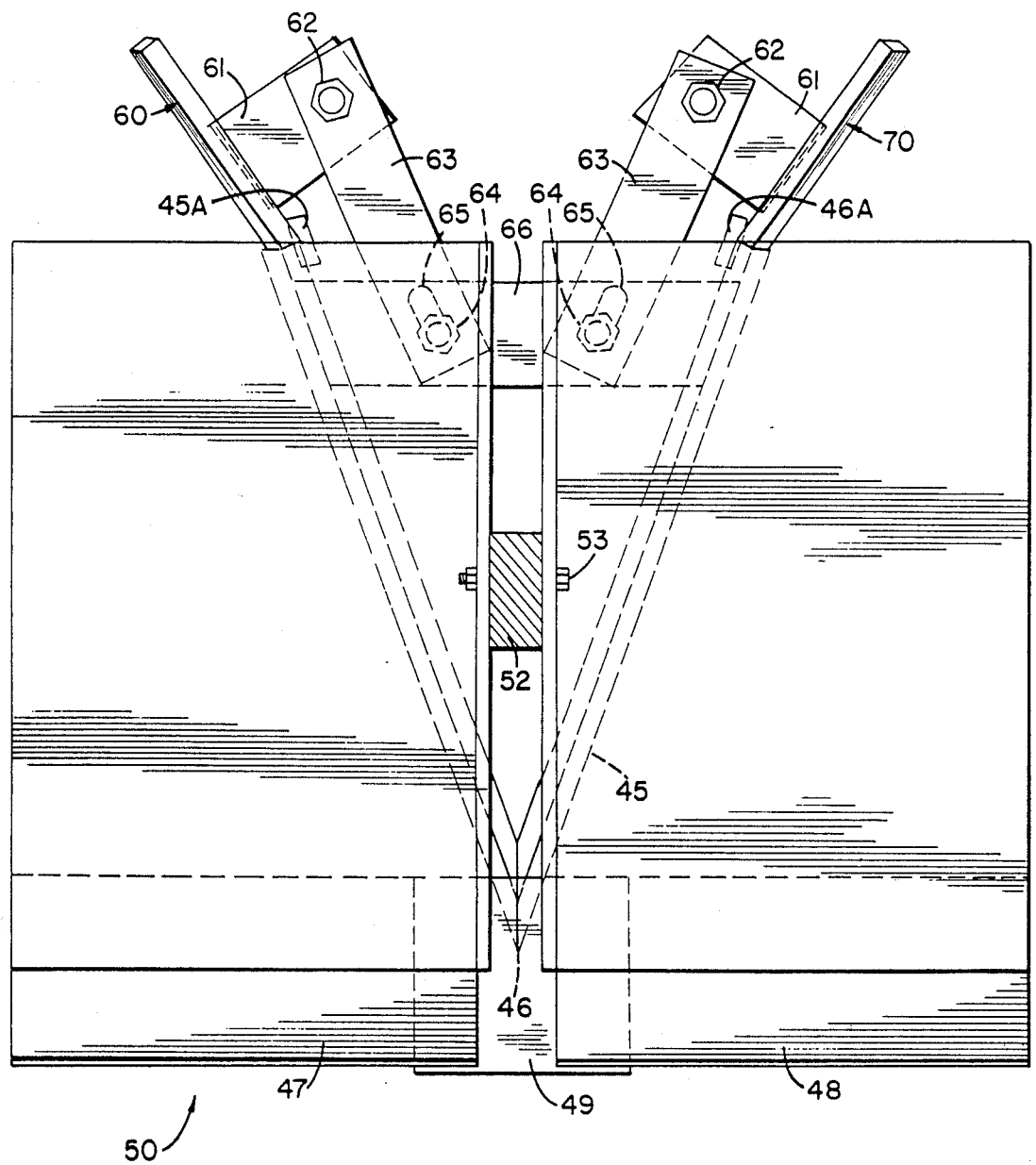
FIG. 5 is a top view of another embodiment of agricultural implement of the invention; this implement is useful for forming ditches or trenches between row crops.
Figure 6:
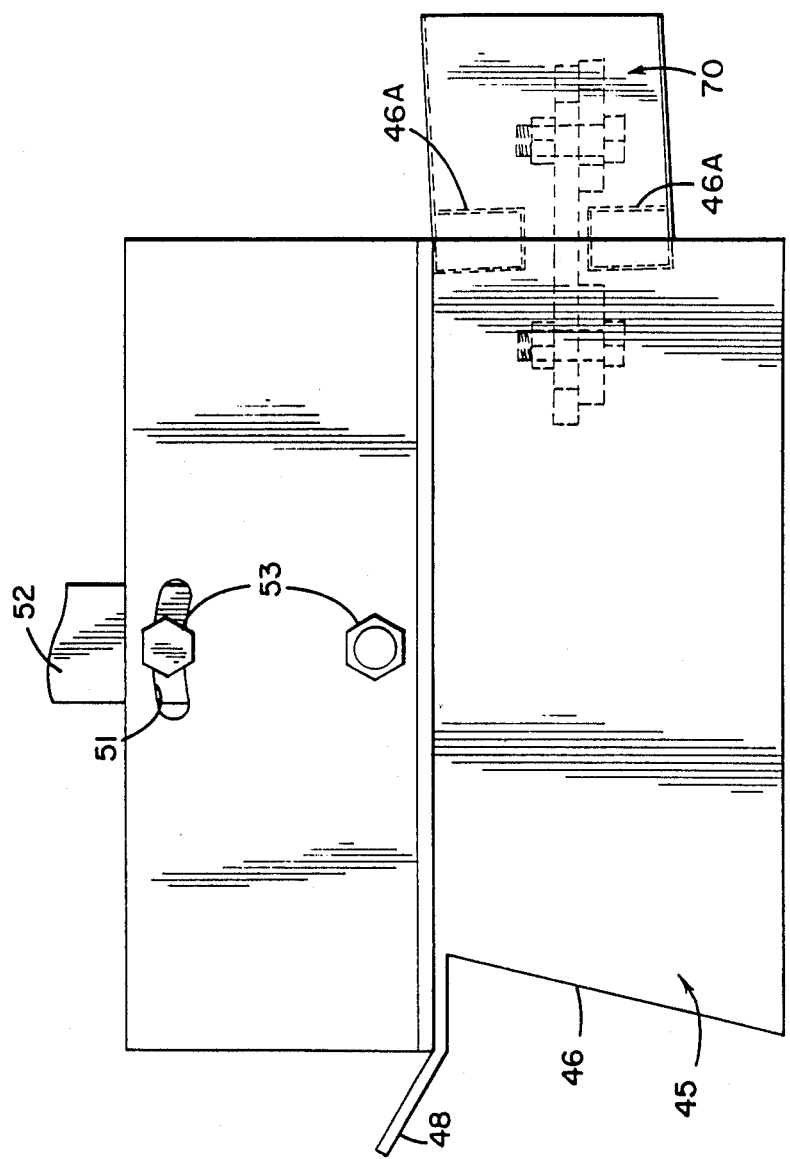
FIG. 6 is a side elevational view of the embodiment of implement which is shown in FIG. 5.
Figure 7:
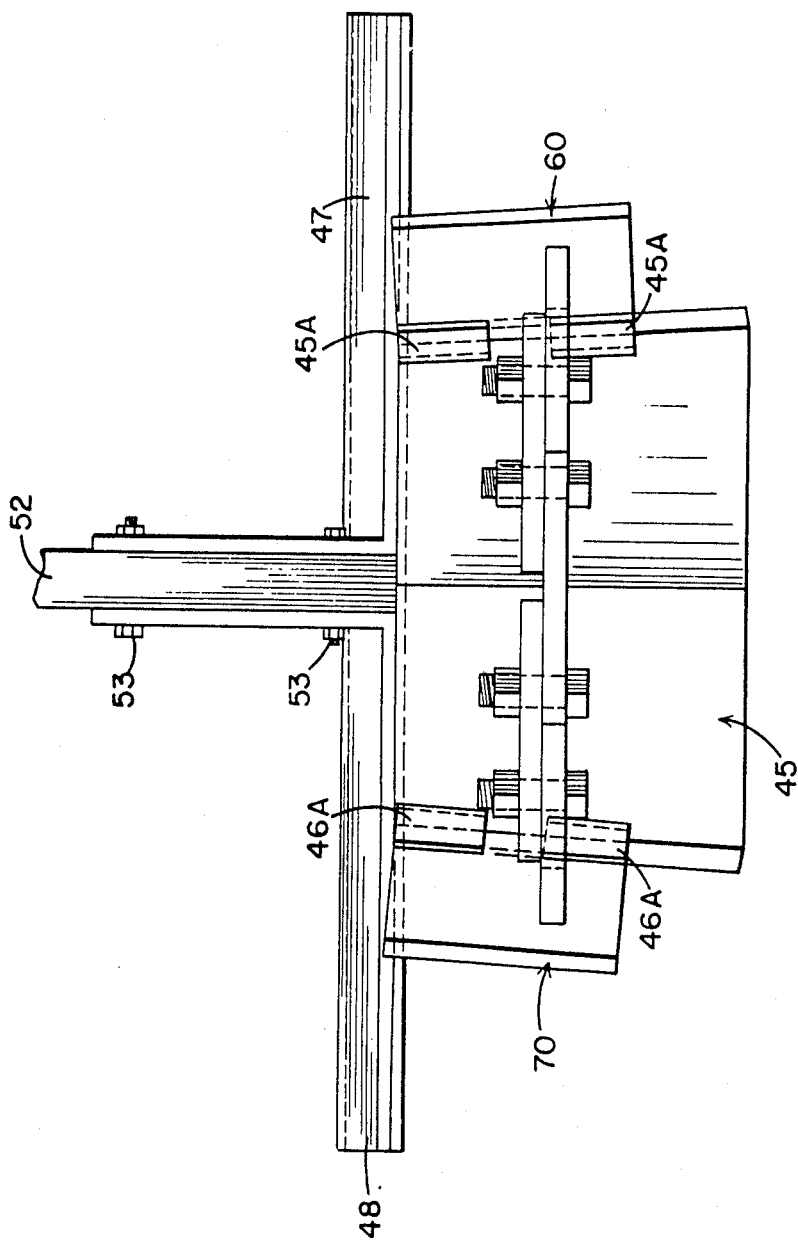
FIG. 7 is a rear elevational view of the implement of FIG. 5.
Figure 8:
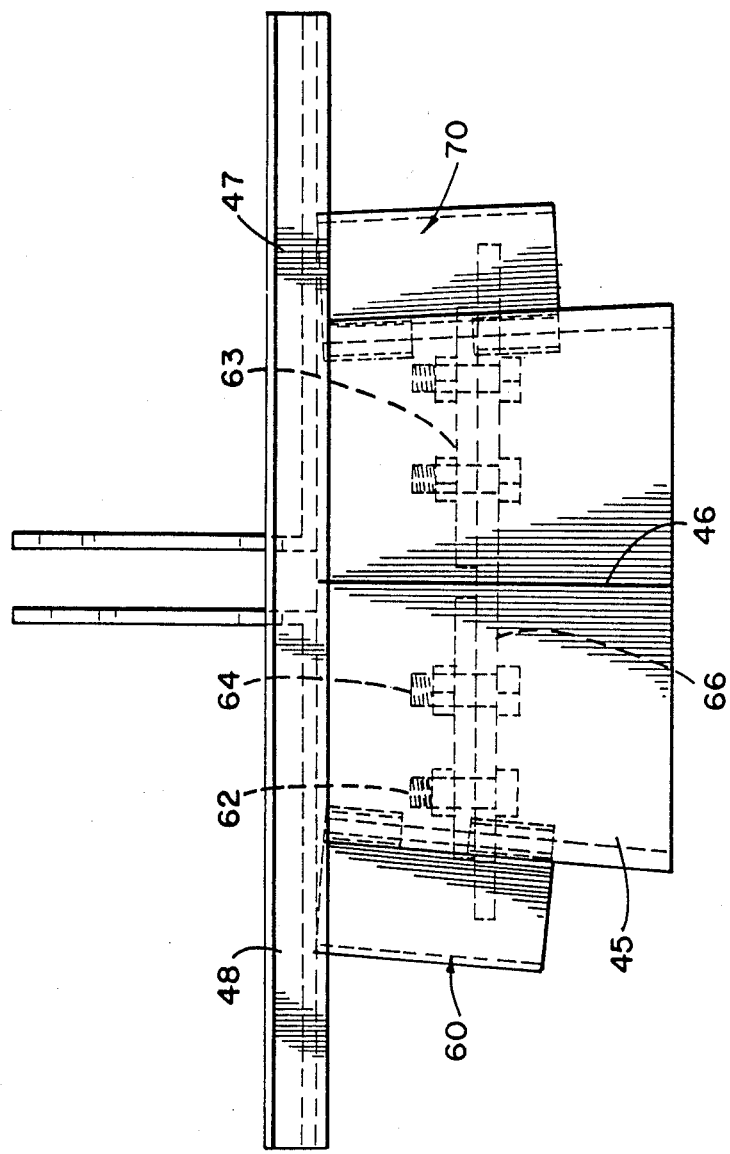
FIG. 8 is a front elevational view of the implement shown in FIG. 5 (without the shank present)

In FIGS. 1, 2, 3 and 4 there is shown one embodiment of agricultural tilling implement 10 of the invention which includes downwardly depending shank 12 which may carry a conventional shoe member on the lower end thereof. A shield member is detachably secured to the shank in a generally horizontal plane and is spaced above the shoe by several inches (e.g., about 8 to 16 inches) depending upon the depth at which one desires to put the shank and shoe into the soil for tilling.

The shield member conveniently comprises two sections 17 and 18 which are connected together, with the shank 12 between them, by means of bolts 23. In this manner the shield member may be detached from the shank, if desired, and it may be adjusted vertically to any desired height relative to the shoe on the shank. Preferably the height of the shield is adjusted such that it is at or near ground level when the shoe and shank are in the soil at the desired depth. Preferably a small shield or plate 20 is connected between shield sections 17 and 18 ahead of the leading edge of shank 12. Bolts 22 may be used to secure plate 20 to the large shield sections. Preferably shield or plate 20 extends back to the leading edge of shank 12, as shown. Alternatively, shield or plate 20 may be welded to one of the shields 17 or 18.

The leading edge of each shield is sloped upwardly as shown so that the shield member prevents soil from passing over the top of the shield member during tilling.

Each shield section 17 and 18 projects outwardly from a respective side of the shank 12 several inches (typically at least about 8 inches on each side). The shield member also projects forwardly of the shank a few inches (e.g., at least about 4 or 6 inches).

The desired width of the shield member is dependent upon the spacing between adjacent rows of growing crops. For example, when the crops are in rows which are 30 inches apart, the shield should extend outwardly at least 9 inches on each side of the shank. For a shank which is 1 inch wide this would mean that the span from one side of the shield member to the opposite side would be 19 inches. When the implement is operated between rows having 30 inch spacing the edges of the shield member would be about 6 inches from each row. When the row spacing is greater than 30 inches th shield member may be wider than 19 inches in span. When the row spacing is very narrow (e.g., 20-22 inches), the total span of the shield member may be as narrow as about 9 inches.

Generally speaking, for use between growing row crops, each section of the shield member on the shank should be at least about 4 inches wide and may be as much as 14 inches wide. The shield preferably projects forwardly of the shank a few inches, as shown, and may extend forwardly of the shank several inches.

For deep tilling of soil the shoe may be about 8 to 16 inches deep in the soil. The shield member is appropriately adjusted on the shank such that it is at or near ground level when the shoe is at the desired depth for tilling.

The shield member prevents soil clumps from being thrown out of the ground and onto the growing crops during tilling between the rows. The shield member also assures that loosened soil moves outwardly smoothly toward the rows and that the soil becomes mixed. The shield member further closes the ground behind the shank as it moves through the soil. This keeps the ground from drying out quickly. The loosened soil then also accepts water rapidly and prevents run-off and soil erosion.

It has been observed that the shield member is beneficial in another respect also. It flattens the loose soil between the rows to leave a wide flat area. For example, between rows having a spacing of about 30 inches or so, the shield member leaves a flat central path of about 12 inches in width. This path is very beneficial for movement of irrigation water between adjacent rows without the loosened soil damming up between the rows to stop the flow of irrigation water.

The shield member illustrated herein may be attached to any type of ripper shank. For example, it may be attached to a conventional straight shank or curved shank. Any type of shoe may be used on the shank. As is well known and understood in the art, the ripper shank is supported by a tool bar or frame which is connected to the farm tractor for towing through the field. Typically the implement includes a plurality of ripper shanks so that the soil between several rows may be tilled in one pass through the field.

Below the shield members are two plate members 24 and 25. The front edge of each plate is disposed adjacent the front or leading edge of shank 12, while the trailing end of each plate is spaced outwardly from the shank so that the two plates are in a generally V-shape.

Preferably the top edge of each plate is secured to the bottom side of the shield member (e.g., with bolts or by welding). Preferably, a brace member 26 is connected between the rear portions of the plate members 24 and 25 as illustrated. The brace may be in the form of a metal bar or strip or it may be a wide metal plate, if desired. Optionally, the rear edge of the shield member may extend over the wing members which are described hereafter.

The height of each plate 24 and 25 may vary, for example, from about 5 to 10 inches. The length may also vary, for example, from about 8 to 15 inches or so.

Behind the trailing edge of plate members 24 and 25 there are provided adjustable wing members or deflectors 30 and 40, respectively. Each wing member is a few inches high and a few inches long. A typical height is about 6 inches, and the typical length is about 4 inches. If desired, however, the wing members may have a length of only about 2 inches or so. For example, when the implement is used between very narrow rows (e.g., 20-22 inches) the wing members may have a length of about 2 to 2.5 inches.

The purpose of the wing members is to push loosened soil outwardly away from the tiller and toward the rows of growing row crops. The greater the extent to which the wing members are angled outwardly, the greater is the amount of loosened soil which is pushed outwardly toward the rows.

Each wing member is movably adjustable as illustrated. Each wing member is fastened to an anchor 31, and bracket 33 connects each anchor to brace member 26. Bolt 32 secures each bracket 33 to anchor 31. Bolt 34 secures each bracket 33 to brace member 26. Each bracket 33 includes a slotted aperture 35, as shown, to provide adjustability. Thus, by loosening the bolts 32 and 34, each wing member may be pivoted or rotated relative to the trailing edge of each plate member. When the wing member is in the desired position, the bolts 32 and 34 may be tightened again to secure the wing member in place.

As illustrated in FIGS. 1-4, the trailing edge of plates 24 and 25 include one or more stop members 24A and 25A against which the leading edge of the wing member may rest. Each stop member serves to retain the leading edge of a wing member at the trailing edge of the plate member.

Figure 9:
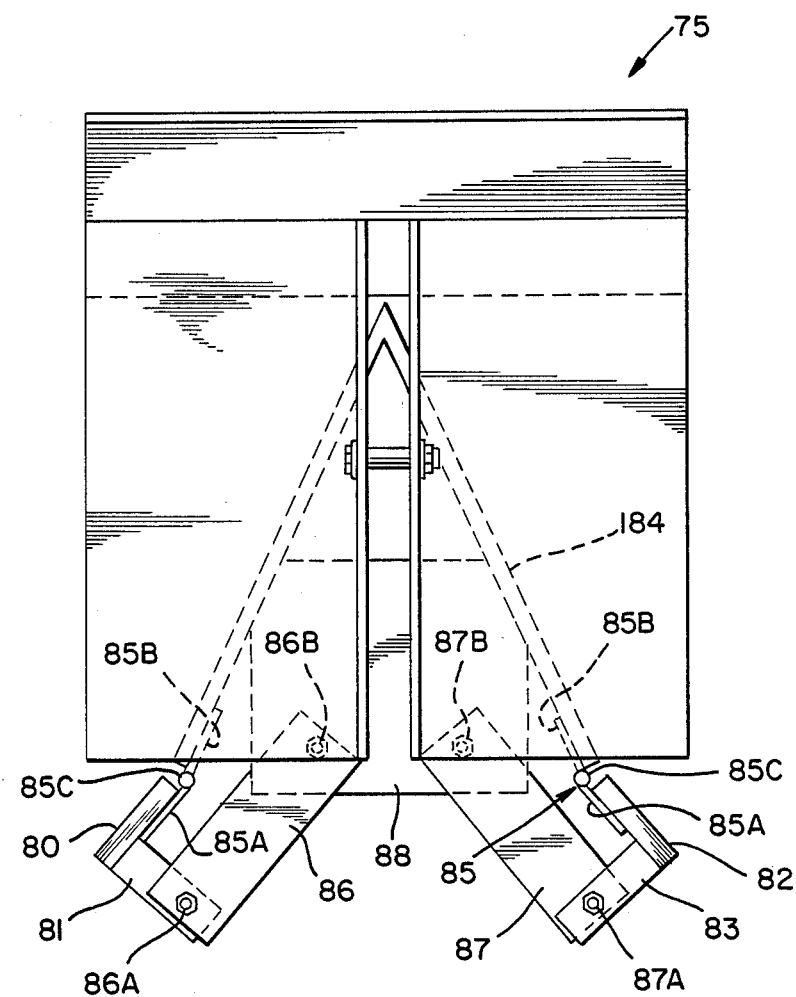
FIG. 9 is a top view of another embodiment of agricultural implement of this invention.
Figure 10:
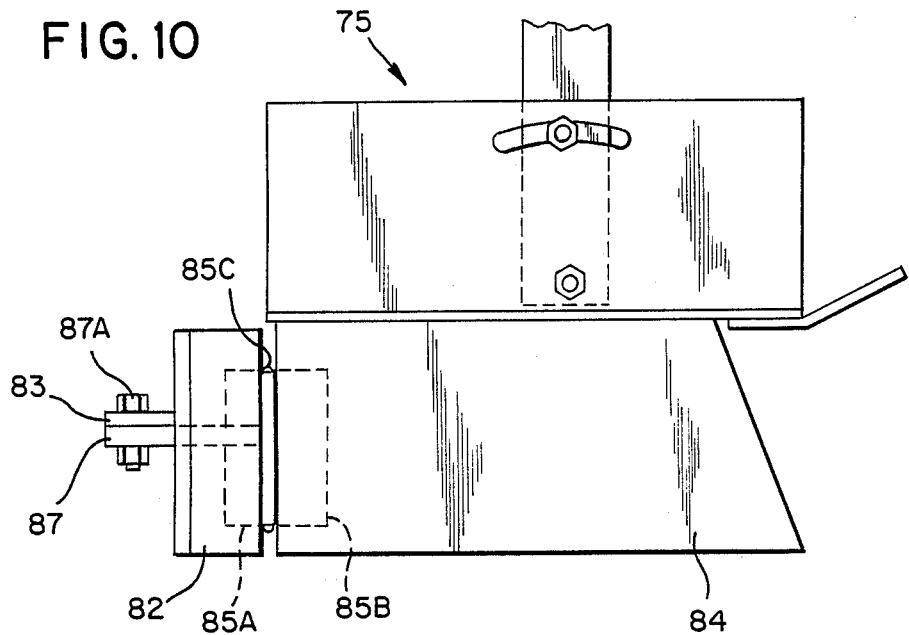
FIG. 10 is a side elevational view of the embodiment of implement shown in FIG. 9.
Figure 11:
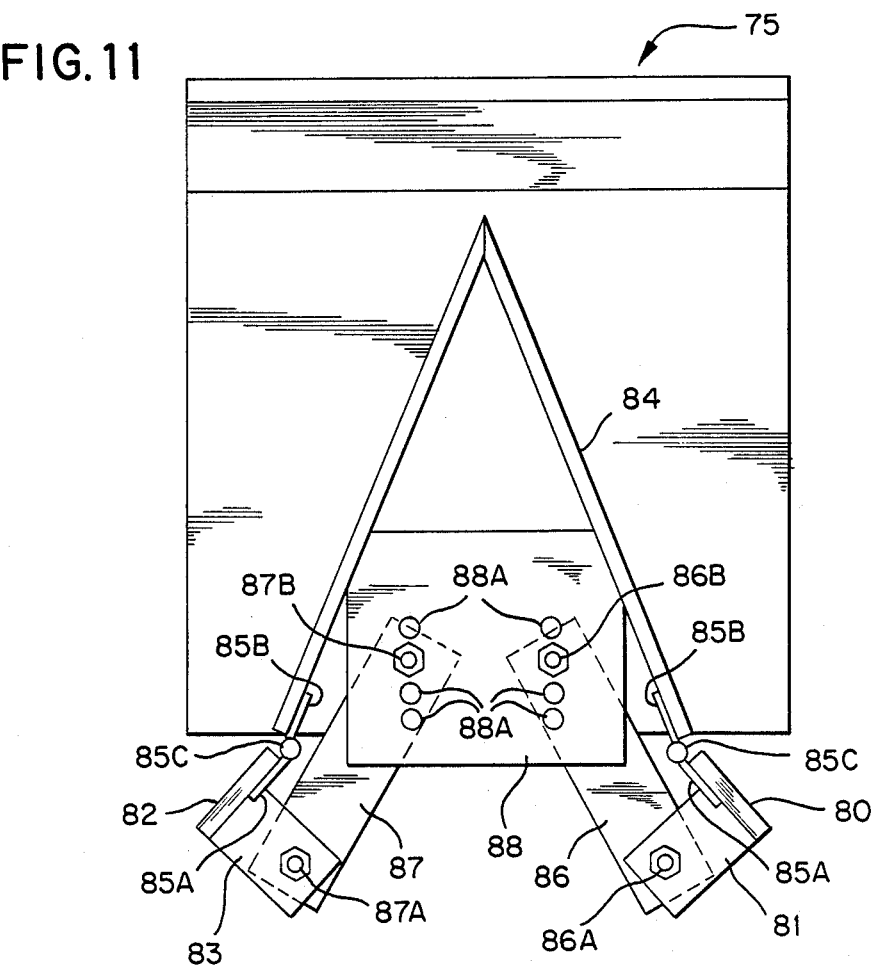
FIG. 11 is a bottom view of the embodiment of implement shown in FIG. 9.

If desired, the leading edge of each wing member could be hinged to the trailing edge of the plate member. This is illustrated in FIGS. 9-11, which are discussed in detail hereafter. Alternatively, each wing member may be hinged to a support bracket carried by the brace member.

This arrangement is very beneficial for urging soil outwardly from the shank during tilling and moving the soil gently around the base of growing plants in the rows in a controlled manner. Thus, the soil urged toward the plants forms a desirable hill in each row around the plants and covers small weeds in the row. The shield also closes the soil behind the shank and reduces soil erosion.

The wing members serve to increase the extent to which loosened soil is urged outwardly toward the rows of growing crops so that larger hills are formed in the rows around the base of the plants. By angling the wing members farther outwardly, they push the loosened soil farther outwardly. Thus, the tiller implement may be used in fields of row crops, regardless of the spacing between adjacent rows.

In FIGS. 5, 6, 7 and 8 there is illustrated a ditching implement 50 of the invention which is attached to the lower end of a downwardly depending shank 52. The ditching implement includes a horizontal shield member comprising sections 47 and 48. The front edge of the shield is sloped upwardly as illustrated, and a small plate or shield 49 is preferably connected between sections 47 and 48 and may be welded or bolted to one or both of such sections.

Disposed beneath the shield member is a V-shaped plate member 45 having outwardly flaring wings, as illustrated. Preferably the top edges of the plate member 45 are secured to the bottom of the shield sections (e.g., by welding or with bolts). The apex 46 of the plate member 45 is the leading edge.

When this ditching implement is pulled through the soil the shield and the V-shaped plate member urge soil outwardly from the shank to form a ditch between the rows of growing crops. The resulting ditch is useful when irrigating the growing crops. This implement also urges soil towards the growing crops and covers small weeds in the row.

The shank 12 may be, for example, 1 inch by 3 inches and about 36 inches long. The upper end of the shank is attached to a conventional tool bar or frame for towing through the field.

The plate member 45 is, for example, about 5 to 10 inches in height. The length of each side of the plate member may also vary, for example, from about 8 to 15 inches or so.

The shield sections in implement 50 may be attached to shank 52 by means of bolts 53, as illustrated. Preferably the vertical flange of each shield section includes a slotted aperture 51 so that the shield and the plate member 45 may be tilted upwardly or downwardly, as desired.

In this embodiment the rear or trailing portion of each side of plate member 45 includes a wing member or deflector (denoted as 60 on one side and 70 on the other side). The wings or plates serve to increase the extent to which loosened soil is urged outwardly toward the rows of growing crops so that larger hills are formed in the rows around the base of the plants. The wing members or deflectors 60 and 70 may vary in size (e.g. they may be, for example, 6 inches high and 4 inches long), and they project outwardly, as illustrated. If desired, the wing members may have a length of only about 2 inches or so. For example, when the implement is used between very narrow rows (e.g., 20-22 inches) the wing members may have a length of about 2 to 2.5 inches.

Each wing member or deflector 60 and 70 is movably adjustable as illustrated. Each wing member is fastened to an anchor 61, and bracket 63 connects each anchor to brace member 66. Bolt 62 secures each bracket 63 to anchor 61. Bolt 64 secures each bracket 63 to brace member 66. Each bracket 63 includes a slotted aperture 65, as shown, to provide adjustability. Thus, by loosening the bolts 62 and 64, each wing member may be pivoted or rotated relative to the trailing edge of each plate member. When the wing member is in the desired position, the bolts 62 and 64 may be tightened again to secure the wing member in place.

As illustrated in FIGS. 5-8, each trailing edge of plate 45 includes one or more stop members 45A and 46A against which the leading edge of the wing members may rest. Each stop member serves to retain the leading edge of a wing member at the trailing edge of the plate member.

If desired, the leading edge of each wing member could be hinged to the trailing edge of the plate member. This is illustrated in FIGS. 9-11, which are discussed in detail hereafter. Alternatively, each wing member may be hinged to a support bracket carried by the brace member.

It is also possible to provide a mounting bracket (having a plurality of spaced apertures therein) which is supported by the brace member. Then the mounting anchor or arm on the rear of the wing member can be secured to the mounting bracket at any desired location to provide the desired angle between the wing member and the plate. Alternatively, the mounting anchor or arm could include a plurality of apertures to provide for adjustable mounting to the mounting bracket, or both the mounting anchor and mounting bracket could include a plurality of apertures. Other equivalent means for adjustable mounting of the wing members could also be used.

Although the wing members are illustrated in the drawings as having a flat face, it is also possible for the face to be cured (e.g., it may be concave surface), if desired. Also, if desired, the rear edge of the shields 47 and 48 could extend over the wing members.

The wing members could have the same height as the plate members they are associated with, if desired, or they may have a height less than the height of the plate members (as illustrated in the drawings). In other words, the wing members could extend downwardly to the lower edge of the plate member, if desired, but this is not required.

As illustrated in FIGS. 9-11, the wing members 80 and 82 may be hinged to the rear or trailing edges of plate 84 of the hiller implement 75 by means of hinges 85. One portion 85A of each hinge is welded or bolted to each wing member while another portion 85B of each hinge is welded or bolted to a rear edge of plate 84. The two hinge portions are joined by means of a pin 85C which allows the hinge portion 85A to pivot with respect to hinge portion 85B. FIG. 9 is a top view of the implement. FIG. 10 is a side elevational view of the same implement. FIG. 11 is a bottom view of the same implement.

An arm or ear member 81 is welded or secured to the back side of wing member 80, and arm or ear member 83 is welded or secured to the back side of wing member 82, as illustrated. Leg or brace members 86 and 87 are connected, respectively, between ear members 81 and 83 and brace plate 88 which is secured between the two sides of plate 84. Bolts 86A and 86B secure leg member 86 to ear 81 and brace plate 88. Bolts 87A and 87B secure leg member 87 to ear 83 and brace plate 88.

Preferably brace plate 88 includes a plurality of spaced apertures 88A to enable the ends of leg members 86 and 87 to be secured to brace plate 88 at different locations. This enables the angle of each wing member with respect to plate 84 to be changed, if desired. Thus, by loosening bolts 86A and 87A and by removing bolts 86B and 87B, the wings 80 and 82 may be pivoted to any desired degree. Then the bolts can be tightened to secure the wings in the desired position again.

Although FIGS. 9-11 illustrate a ditcher implement, the same arrangement for hinged wing members is equally applicable to hiller implements of the type illustrated in FIGS. 1-4.

The hinges illustrated herein may be secured, for example, by welding to the wing members and the plates. Alternatively, the hinges may be bolted to the wings and the plates. Of course, a combination of welding and bolts may also be used.

Other variants are possible without departing from the scope of this invention.

What is claimed is:

1. In an agricultural ripper tiller implement for deep tilling of soil between growing row crops, wherein said implement includes a downwardly depending shank and a shoe member carried by the lower end of said shank; wherein the improvement comprises a shield member which is adapted to be detachably secured to said shank in a generally horizontal plane; wherein the front edge of said shield member is sloped upwardly; wherein said shield member extends outwardly from opposite sides of said shank at least about 8 inches; further comprising first and second downwardly depending plate members having front and rear portions, wherein said first plate member is disposed beneath said shield member on one side of said shank and said second plate member is disposed beneath said shield member on the opposite side of said shank; wherein the front portion of each said plate member is disposed adjacent the front edge of said shank, and wherein the rear portion of each said plate member is spaced outwardly from said shank in a manner such that said plate members form a V-shape; further comprising first and second wing members supported at said rear portion of said first and second plate members, respectively; wherein each said wing member is movably adjustable in a manner such that it may project outwardly from said rear portion of a said plate member; wherein said shield member is positioned on said shank in a manner such that when said shank and shoe are pulled through the soil said shield member and said plate members urge said soil outwardly from said shank to said row crops to form a hill in each said row without covering said crops.

2. The improvement of claim 1, wherein said shield member comprises first and second sections which are connected to each other, with said shank being disposed between said sections.

3. The improvement of claim 1, wherein said shield member extends forwardly of said shank at least about 4 inches.

4. The improvement of claim 1, wherein said shield member is vertically adjustable on said shank.

5. The improvement of claim 2, wherein said first and second sections are bolted together; and wherein said improvement further comprises a third section which extends between said first and second sections in front of said shank.

6. The improvement of claim 1, wherein the top edges of said first and second plate members are secured to said shield member.

7. The improvement of claim 1, wherein each said plate member has a height of at least about 6 inches and a length of at least about 8 inches.

8. The improvement of claim 1, wherein a brace member is connected between said rear portions of said plate members; wherein said first and second wing members are each attached to separate mounting brackets; and wherein said mounting brackets are adjustably mounted to said brace member in a manner such that the angle between each said wing member and corresponding plate member may be increased or decreased.

9. The improvement of claim 8, wherein each said wing member is hinged to said rear portion of said plate member.

10. A ditching implement which is useful for ditching soil between row crops, said implement comprising:
    (a) a depending shank member;
    (b) a shield member attached to said shank in a generally horizontal plane; wherein the front edge of said shield member is sloped upwardly; wherein said shield member extends outwardly from opposite sides of said shank at least about 8 inches;
    (c) a V-shaped plate member disposed beneath said shield member; wherein said plate member includes first and second trailing edges;
    (d) first and second wing members; wherein said first wing member is supported at said first trailing edge of said plate member; wherein said second wing member is supported at said second trailing edge of said plate member; wherein each said wing member is movably adjustable in a manner such that it may project outwardly from a said trailing edge of said plate member;
    (e) support means adapted to support said shank member;
wherein when said V-shaped plate member is pulled through the soil said shield member, said V-shaped plate member, and said wing members urge said soil outwardly from said shank to form a ditch between said row crops.

11. A ditching implement in accordance with claim 10, wherein the top edge of said V-shaped plate member is secured to the bttom of said shield member.

12. A ditching implement in accordance with claim 10, wherein said shield member is attached to said shank by means of bolts; wherein said shield member includes a slotted aperture for receiving one of said bolts; wherein said shield member may be tilted downwardly or upwardly relative to said shank.

13. A ditching implement in accordance with claim 10, wherein said V-shaped plate member comprises first and second plates which are secured to each other at their leading ends.

14. A ditching implement in accordance with claim 10, wherein said plates each have a height of about 5 to 10 inches and a length of about 10 to 15 inches.

15. A ditching implement in accordance with claim 10, wherein said support means comprises a tool bar.

16. A ditching implement in accordance with claim 13, further comprising a brace member connected between said plates; wherein said first and second wing members are each attached to separate mounting brackets; and wherein said mounting brackets are adjustably mounted to said brace member in a manner such that the angle between each said wing member and each said plate may be increased or decreased.

17. A ditching implement in accordance with claim 16, wherein each said wing member is hinged to a said trailing edge of said plate member.

18. In an agricultural ripper implement for deep tilling of soil between growing row crops, wherein said implement includes a downwardly depending shank and a shoe member carried by the lower end of the shank; wherein a shield member is adapted to be detachably secured to said shank in a generally horizontal plane; wherein the improvement comprises first and second downwardly depending plate members having front and rear portions, wherein said first plate member is disposed beneath said shield member on one side of said shank and said second plate member is disposed beneath said shield member on the opposite side of said shank; wherein the front portion of each said plate member is disposed adjacent the front edge of said shank, and wherein the rear portion of each said plate member is spaced outwardly from said shank in a manner such that said plate members form a V-shape; further comprising first and second wing members supported at said rear portion of said first and second plate members, respectively; wherein each said wing member is movably adjustable in a manner such that the angle between each said wing member and each said plate member may be increased or decreased.

19. The improvement of claim 18, wherein each said wing member is hinged to the trailing edge of a said plate member.

20. A ditching implement which is useful for ditching soil between row crops, said implement comprising:
(a) a depending shank member;
(b) a shield member attached to said shank in a generally horizontal plane; wherein the front edge of said shield member is sloped upwardly; wherein said shield member extends outwardly from opposite sides of said shank at least about 8 inches;
(c) a V-shaped plate member disposed beneath said shield member; wherein said plate member comprises first and second plates which are secured together at their leading ends;
(d) a brace member connected between said plates;
(e) first and second wing members; wherein said wing members are each attached to separate mounting brackets; and wherein said mounting brackets are adjustably mounted to said brace member in a manner such that the angle between each said wing member and each said plate may be increased or decreased;
(f) support means adapted to spport said shank member; wherein when said V-shaped plate member is pulled through the soil said shield member, said V-shaped plate member, and said wing members urge said soil outwardly from said shank to form a ditch between said row crops.

* * * * *